US011151662B2

(12) United States Patent
Barash et al.

(10) Patent No.: US 11,151,662 B2
(45) Date of Patent: Oct. 19, 2021

(54) METHOD AND APPARATUS FOR MONITORING COMPLEX CONTAGION AND CRITICAL MASS IN ONLINE SOCIAL MEDIA

(71) Applicant: The Johns Hopkins University, Baltimore, MD (US)

(72) Inventors: Vladimir Barash, New York, NY (US); Christopher J. Cameron, Ithaca, NY (US); Michael W. Macy, Ithaca, NY (US); Clayton R. Fink, Silver Spring, MD (US); Aurora C. Schmidt, Fulton, MD (US); John W. Kelly, New York, NY (US)

(73) Assignee: The Johns Hopkins University, Baltimore, MD (US)

( * ) Notice: Subject to any disclaimer, the term of this patent is extended or adjusted under 35 U.S.C. 154(b) by 185 days.

(21) Appl. No.: 16/142,500

(22) Filed: Sep. 26, 2018

(65) Prior Publication Data
US 2019/0164234 A1 May 30, 2019

Related U.S. Application Data

(60) Provisional application No. 62/592,554, filed on Nov. 30, 2017.

(51) Int. Cl.
*G06Q 20/40* (2012.01)
*G06Q 20/32* (2012.01)
(Continued)

(52) U.S. Cl.
CPC ........... *G06Q 50/01* (2013.01); *G06F 16/285* (2019.01)

(58) Field of Classification Search
CPC .............................. G06Q 50/01; G06F 16/285
See application file for complete search history.

(56) References Cited

U.S. PATENT DOCUMENTS 8,881,040 B2 * 11/2014 Li ........................... G06Q 10/10
715/764
2005/0256949 A1 * 11/2005 Gruhl ..................... G06Q 50/01
709/223
(Continued)

OTHER PUBLICATIONS

Fink, Clay et al., "Complex contagions and the diffusion of popular Twitter hashtags in Nigeria," Soc. Netw. Anal. Min. (2016) 6:1, Dec. 26, 2015, pp. 1-19, available at https://link.springer.com/content/pdf/10.1007/s13278-015-0311-z.pdf (Year: 2015).*

(Continued)

*Primary Examiner* — Eric T Wong
*Assistant Examiner* — Douglas W Pinsky
(74) *Attorney, Agent, or Firm* — Noah J. Hayward

(57) ABSTRACT

A method for determining social contagion while monitoring social media may be executable via operation of configured processing circuitry. The method may include receiving data indicative of social media activity of a plurality of users, selecting features of interest from the data, building a relationship network indicative of connections between the users and local networks to which various ones of the users belong, analyzing the features of interest to determine candidate features for classification as social contagion, determining a complex social contagion score for the candidate features, and providing an indication regarding the classification as social contagion based on the complex social contagion score.

19 Claims, 4 Drawing Sheets

(51) Int. Cl.
  *G06Q 20/38* (2012.01)
  *H04L 29/06* (2006.01)
  *G06Q 50/00* (2012.01)
  *G06F 16/28* (2019.01)

(56) References Cited

U.S. PATENT DOCUMENTS

| | | | | |
|---|---|---|---|---|
| 2008/0270615 A1* | 10/2008 | Centola | | G06Q 30/02 709/228 |
| 2016/0042284 A1* | 2/2016 | Menczer | | G06Q 30/0202 706/46 |
| 2016/0048556 A1* | 2/2016 | Kelly | | G06Q 30/02 707/767 |

OTHER PUBLICATIONS

C. Fink et al., "Complex contagions and the diffusion of popular Twitter hashtags in Nigeria," Soc. Netw. Anal. Min. (2016)6:1, Dec. 26, 2015, pp. 1-19, available at https://link.springer.com/content/pdf/10.1007/s13278-015-0311-z.pdf (Year: 2015).*
V. Barash et al., "Critical phenomena in complex contagions," 2012, Social Networks 34, 451-461 (Year: 2012).*
V. Barash et al., "The Dynamics of Social Contagion," PhD Thesis, Cornell University (Year: 2011).*
D. Centola et al., "Complex Contagion and the Weakness of Long Ties," 2005; retreived from: http://web.mit.edu/econsocseminar/wwwWLT_final.pdf (Year: 2005).*
L. Weng et al., "Virality Prediction and Community Structure in Social Networks," 2013, Scientific Reports, 3:2522 (Year: 2013).*
L. Weng et al., "Predicting Successful Memes using Network and Community Structure," 2014, Association for the Advancement of Artificial Intelligence, Proceedings of the Eighth International AAAI Conference on Weblogs and Social Media (Year: 2014).*
J. Yang et al, "Patterns of Temporal Variation in Online Media," 2011, Proc. ACM Intl. Conf. on Web Search and Data Mining, (WSDM 11), 177-186 (Year: 2011).*
Asur et al., "Trends in Social Media: Persistence and Decay," 2011, Proc. Intl. AAAI Conf. on Weblogs and Social Media (Year: 2011).*
F. Wu et al., "Novelty and Collective Attention,"2007, Proc. Natl. Acad. Sci. 104(45):17599-17601 (Year: 2007).*
M. Herrera et al., "Understanding Social Contagion in Adoption Processes Using Dynamic Social Networks," 2015, PLoS ONE 10(10): e0140891 (Year: 2015).*
D. Romero et al., "Differences in the Mechanics of Information Diffusion Across Topics: Idioms, Political Hashtags, and Complex Contagion on Twitter," 2011, IW3C2, WWW 2011—Session: Diffusion, Hyderabad, India (Year: 2011).*
K. Dey et al. Literature Survey on Interplay of Topics, Information Diffusion and Connections on Social Networks, Jun. 3, 2017, arXiv:1706.00921v1 [cs.SI] (Year: 2017).*
M. Li et al., "A Survey on Information Diffusion in Online Social Networks: Models and Methods," Sep. 29, 2017, Information 2017, 8, 118 (Year: 2017).*
M. Liu et al., "Social contagions on time-varying community networks," May 9, 2017, Physical Review E 95, 052306 (2017) (Year: 2017).*
M. Karsai, "Local cascades induced global contagion: How heterogeneous thresholds, exogenous effects, and unconcerned behaviour govern," 2016, Scientific Reports 6:27178 (Year: 2016).*
H. Wang et al., "Modeling Information Diffusion in Online Social Networks with Partial Differential Equations," 2013, arXiv: 1310.0505v1 [cs.SI] (Year: 2013).*
A. Cintron-Arias, "To go viral," 2014, arXiv:1402.3499v1 [physics.soc-ph] (Year: 2014).*
B. Goode, "Pricing a Protest: Forecasting the Dynamics of Civil Unrest Activity in Social Media," 2015, PLoS ONE 10(10): e0139911 (Year: 2015).*
E. Ubaldi et al., "Asymptotic theory of timevarying social networks with heterogeneous activity and tie allocation," 2016, Scientific Reports 6:35724 (Year: 2016).*
Fink, Clay et al., "Complex contagions and the diffusion of popular Twitter hashtags in Nigeria," Soc. Netw. Anal. Min. (2016) 6:1, Dec. 26, 2015, pp. 1-19.

* cited by examiner

METHOD AND APPARATUS FOR MONITORING COMPLEX CONTAGION AND CRITICAL MASS IN ONLINE SOCIAL MEDIA

CROSS-REFERENCE TO RELATED APPLICATIONS

This application claims the benefit of and priority to U.S. Provisional Application No. 62/592,554 filed on Nov. 30, 2017, the entire contents of which are hereby incorporated herein by reference.

STATEMENT OF GOVERNMENTAL INTEREST

This invention was made with government support under grant/cooperative agreement award number FA9550-15-1-0036 awarded by the U.S. Air Force. The government has certain rights in the invention.

TECHNICAL FIELD

Example embodiments generally relate to techniques for monitoring activity on social media and, in particular, relate to apparatuses (and/or methods executable by configured apparatuses) that are capable of monitoring social media activity and detecting the emergence of complex contagion and critical mass.

BACKGROUND

With the ubiquitous nature of computers and mobile communication devices, connectivity to communication networks has never been easier or more prevalent. Moreover, the sharing of information and ideas is also currently accomplished with far fewer limitations than in the past. Social media have facilitated the creation and sharing of such information and ideas via various communities and networks. In fact, social media have contributed to a number of transformative social movements in recent years including, for example, the Arab Spring, Occupy Wall Street, and various political campaigns and movements.

Recent approaches in social science research have sought to understand the dynamics by which social movements break out of local networks and become widespread phenomena. For example, the advent of global online social networks and the more recent emergence of the ability to see digital traces of the behavior of billions of individuals has caused some researchers to attempt to draw links between activity in the social networks and mass action in marketplaces, on streets, or in the voting booth. Additionally, certain phenomena monitored on social media may act like social contagion, such as social movements, rumors, emotional outbursts, etc., that spread from person to person in a viral manner, e.g., are spread or circulated rapidly and widely from one person to others. Thus, there is an opportunity and need to monitor activities on social media to identify which phenomena are likely to have significant online and/or offline effects and, more particularly, to analyze and exploit complex contagion and critical mass as indicators of virality.

BRIEF SUMMARY OF SOME EXAMPLES

Some example embodiments include a system that is capable of monitoring social media activity and detecting the emergence of complex contagion and critical mass.

In one example embodiment, an apparatus including processing circuitry configured to execute instructions that, when executed, cause the apparatus to perform various operations may be provided. The operations may include receiving data indicative of social media activity of users, selecting features of interest from the data, building a relationship network indicative of connections between the users and local networks to which various ones of the users belong, analyzing the features of interest to determine candidate features for classification as social contagion, determining a complex social contagion score for the candidate features, and providing an indication regarding the classification as social contagion based on the complex social contagion score.

In another example embodiment, a method for determining social contagion while monitoring social media may be provided. The method may be executable via operation of configured processing circuitry. The method may include receiving data indicative of social media activity of a plurality of users, selecting features of interest from the data, building a relationship network indicative of connections between the users and local networks to which various ones of the users belong, analyzing the features of interest to determine candidate features for classification as social contagion, determining a complex social contagion score for the candidate features, and providing an indication regarding the classification as social contagion based on the complex social contagion score.

BRIEF DESCRIPTION OF THE SEVERAL VIEWS OF THE DRAWINGS

Figure 1:
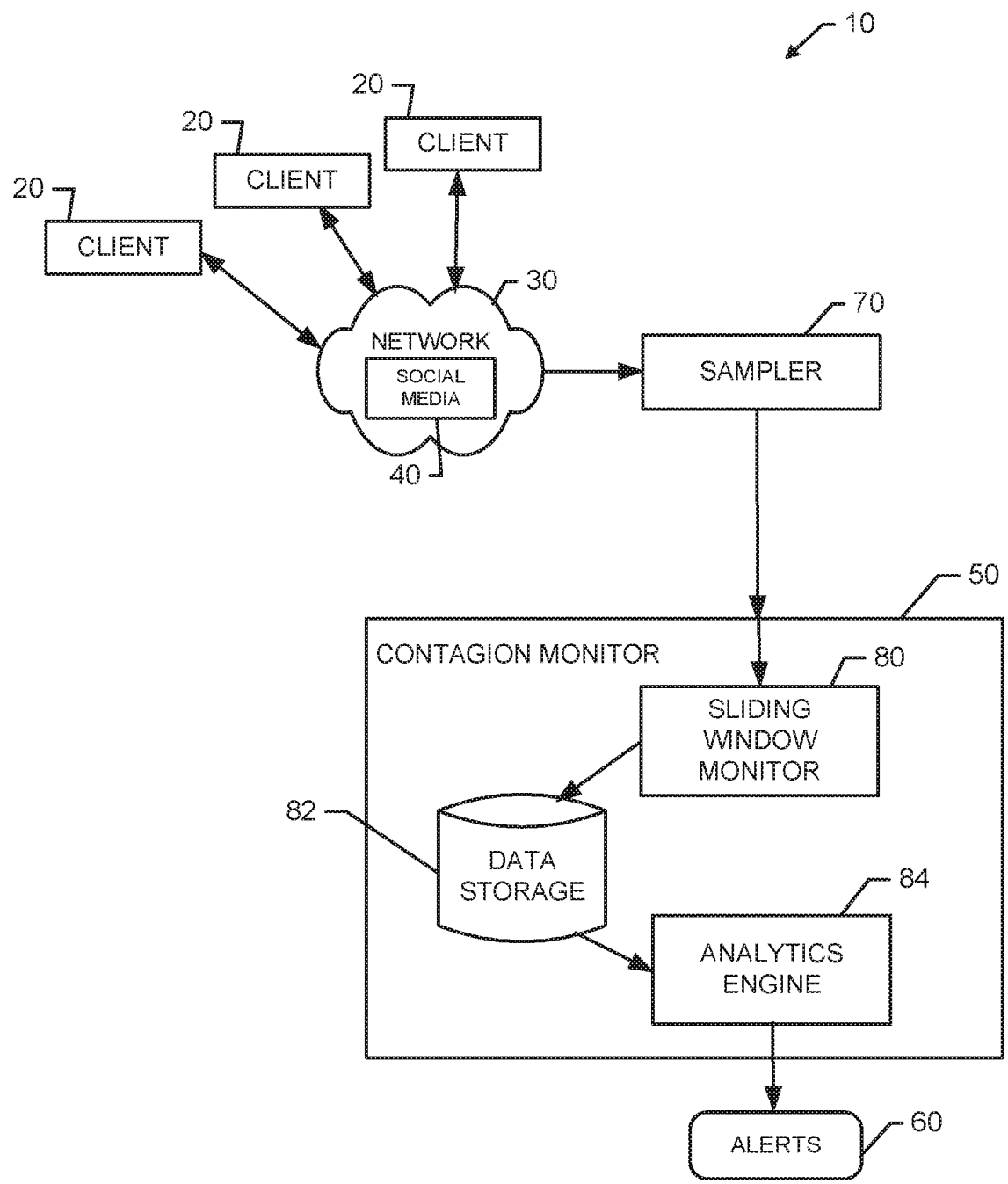
Figure 2:
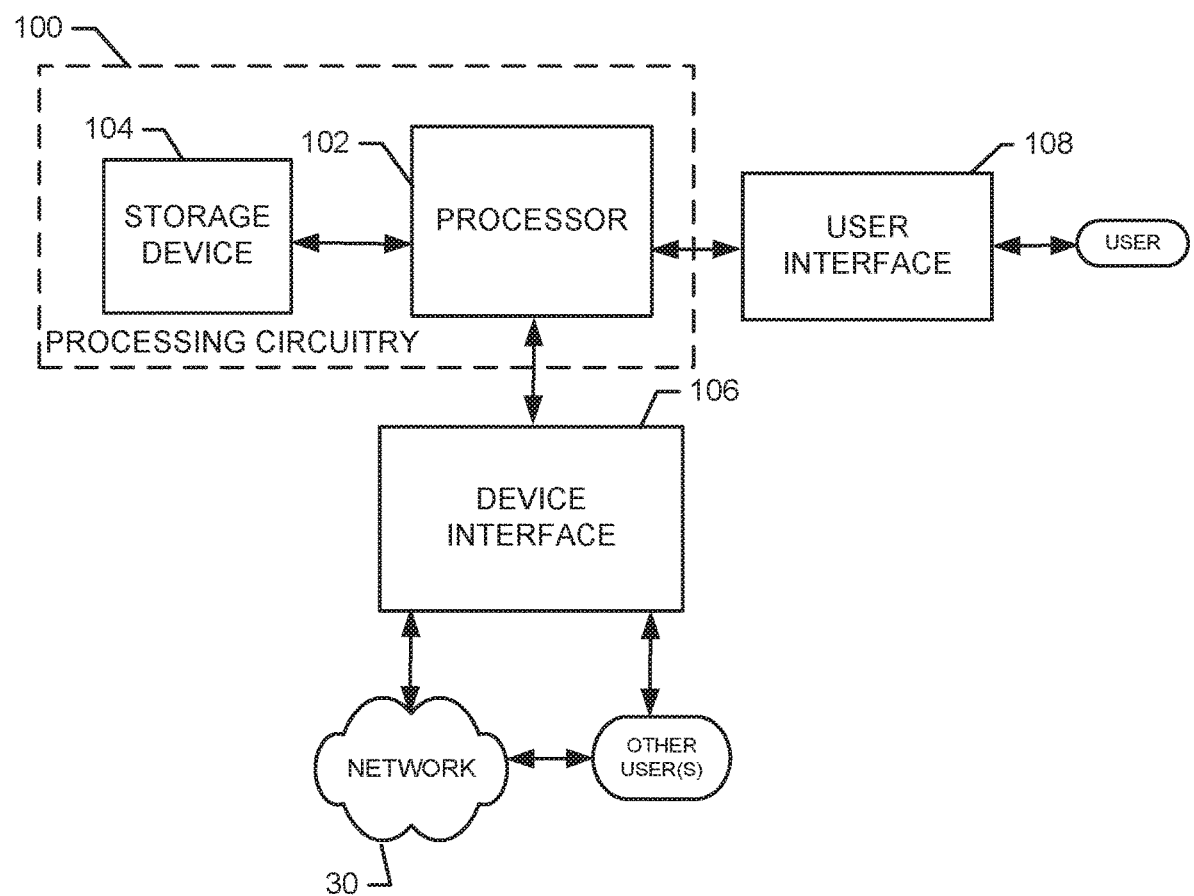
Figure 3:
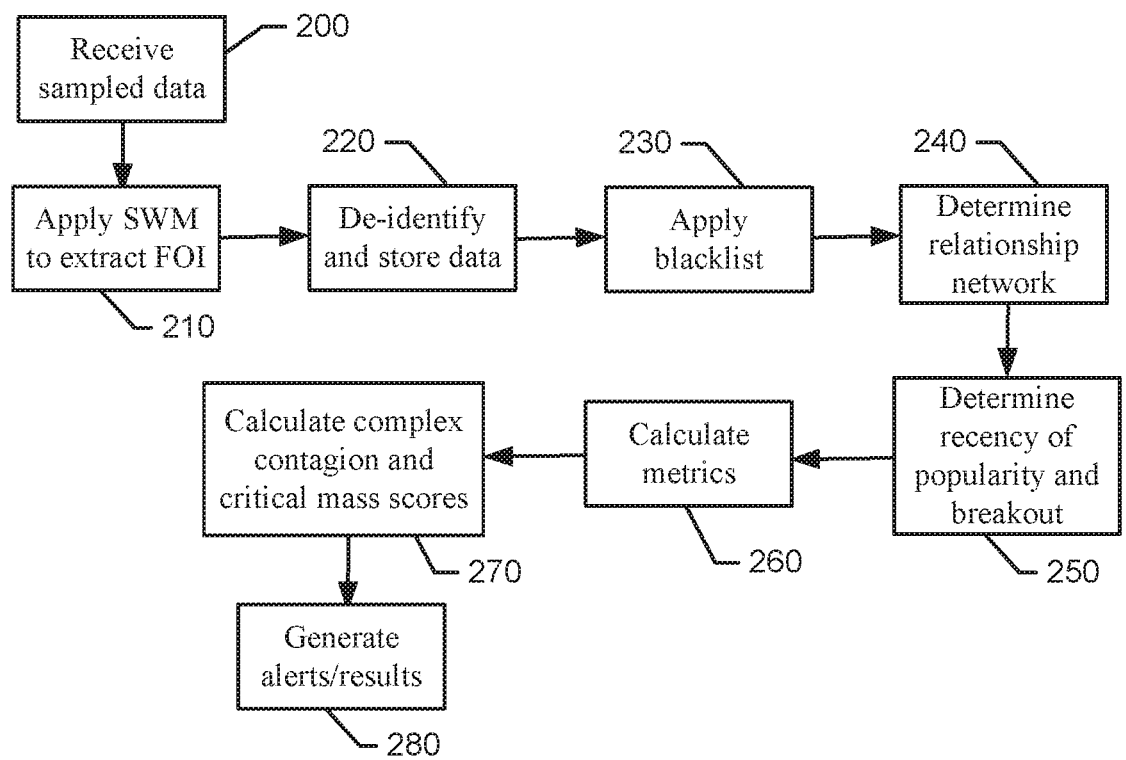
Figure 4:
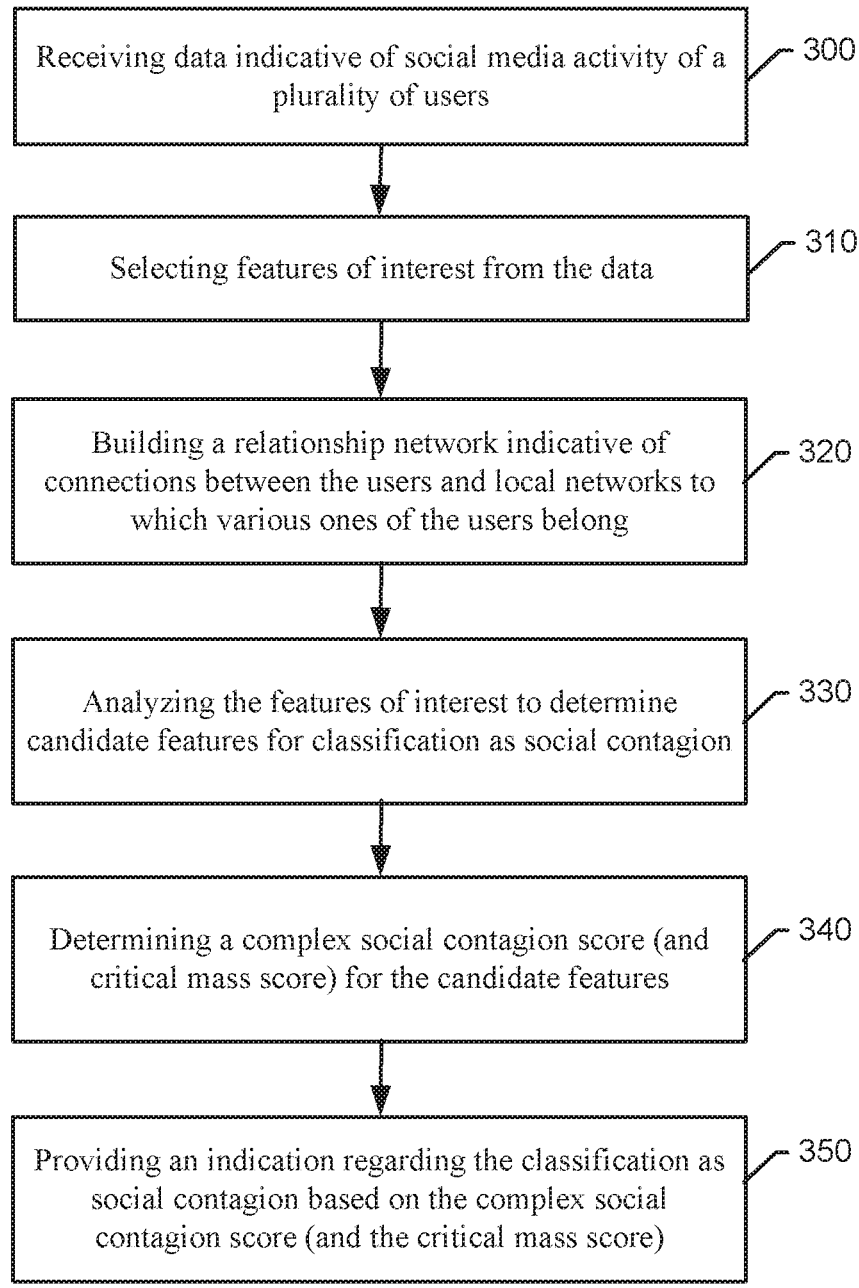

Having thus described non-limiting, exemplary embodiments of the invention in general terms, reference will now be made to the accompanying drawings, which are not necessarily drawn to scale, and wherein:

FIG. 1 is a functional block diagram illustrating a system for monitoring social media for social contagion according to an example embodiment;

FIG. 2 is a functional block diagram illustrating an apparatus that may be configured to act as a contagion monitor according to an example embodiment;

FIG. 3 is a workflow diagram showing operations associated with identifying social contagion in accordance with an example embodiment; and FIG. 4 is a block diagram of a method for detection of social contagion in accordance with an example embodiment.

DETAILED DESCRIPTION

Some additional example embodiments will now be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As noted above, social contagion may be a process by which various beliefs or behaviors spread through human social networks. Simple contagion may occur when only one adopting neighbor is required for spread of the contagion due to the low risk or cost of the adoption decision. However, complex contagion may require two or more adopting neighbors for spreading due to the high risk or cost of the adoption decision. In this regard, complex contagion may require social reinforcement before the adoption decision is made. The requirement for multiple adopting neighbors can often impede the spread of complex contagions, and may limit the occurrence of complex contagions to limited contexts such as, for example, densely connected regions of a network. Meanwhile, critical mass is defined as a point where there are sufficient numbers of adopters in a region for a contagion to spread via long ties to remote, uninfected regions of a network. Using an understanding of the terms and phenomena discussed above, an example embodiment of a social contagion monitoring system will be described in greater detail below.

In this regard, some example embodiments may relate to the provision of a system that is capable of monitoring social media activity and detecting the emergence of complex contagion and critical mass. In an example embodiment, a tool may be provided that is configured to monitor streams of data associated with online social media in order to scan for social contagion. The tool may be configured to de-identify the data that is studied, in order to protect the identity of the individuals involved. Moreover, the tool may enable autonomous monitoring to not only detect social contagion, but to further make an algorithmic judgment about the dynamics of the detected social contagion over time. In particular, the tool may be configured to calculate a complex contagion score that estimates a threshold of participation in the movement or activity that is detected, and also predict whether the movement or activity is about to break out of its local network cluster. Accordingly, researchers can predict whether a movement or activity over time is a low-threshold movement that has little cost to participation, a high-threshold movement that has not yet broken out of its local network cluster, and a high threshold movement that has broken out of its local network. The latter movements are both costly enough (e.g., have high enough stakes) and have enough reach to have a probability of effecting transformative political or social change.

Example embodiments may therefore enable the use of large observational datasets in connection with a formal model of social contagion in order to develop what is effectively an early warning system for the detection of impending virality of certain beliefs and behaviors that may drive social movements and mass mobilizations. As such, policy makers may be enabled to obtain an understanding of contentious issues and potential instability through the provision of sociopolitical situational awareness in regions of interest via example embodiments.

An example embodiment of the invention will now be described in reference to FIG. 1. As shown in FIG. 1, a system 10 according to an example embodiment may include a plurality (and in many cases, a multitude) of client devices (e.g., clients 20). Notably, although FIG. 1 illustrates three clients 20, it should be appreciated that many more clients 20 may be included in some embodiments and thus, the three clients 20 of FIG. 1 are simply used to illustrate a potential for a multiplicity of clients 20 and the number of clients 20 is in no way limiting to other example embodiments.

The example described herein will be related to an asset comprising a programmed computer or analysis terminal to illustrate one example embodiment. However, it should be appreciated that example embodiments may also apply to any asset including, for example, any programmable device that is capable of interacting with data received from portions of a network 30 to monitor the communications between and various network devices that may consume, share or generate content, or otherwise execute applications on or in association with the network 30 as described herein.

Each one of the clients 20 may include or otherwise be embodied as computing device (e.g., a computer, a network access terminal, a personal digital assistant (PDA), cellular phone, smart phone, or the like) capable of communication with or over a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 including, for example, the generation, consumption or sharing of various content items via the network 30.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, the clients 20 may be coupled via the network 30 in order to participate in social media 40 or social networking services, which may themselves be supported by one or more application servers and, in some cases, may be accessible through web interfaces at respective ones of the clients 20. The web interfaces may, for example, provide access to the social media 40 via Short Message Service (SMS), mobile-device application software ("apps"), or various other means. The clients 20 may, in some cases, each be associated with a single individual. The individuals depicted may or may not know each other, or otherwise be associated with each other via various direct or indirect links of a social network. However, it should be understood that among the potential multitude of clients 20 that may exist, some will know each other or be directly linked to others within a local network. Meanwhile, others will not know each other, and may instead only be indirectly linked to each other via ties that can be either short (i.e., indirect connections via a small number of links) or long (i.e., indirect connections via a large number of links).

In an example embodiment, a contagion monitor 50 may be operably coupled to the network 30 to monitor data associated with the social media 40 to make determinations regarding complex contagion and critical mass, and provide alerts 60 based on those determinations. The data monitored may depend on the social media 40 with which the data is associated. As such, if the social media 40 is an online news and social networking service in which users post and interact via short messages, such as TWITTER®, for example, then the data may include text tokens and hashtags, along with historical information regarding user activity and other data tracing information. However, for other examples of social media 40, the data could be other information indicative of a person's (or client's) online activity. The specific event that is desirable to identify within the data is the adoption of an idea or support of a movement. In the context of TWITTER®, for example, the specific event of adoption may be indicated when the person first sends a message (e.g., a TWEET®) or "tweets" about a particular topic. Accordingly, the contagion monitor 50 may analyze the data that is monitored in association with the network 30 in order to identify adoption events over time as potential transmission of social contagion.

In some cases, the amount of data generated with the network 30 may be extensive. Thus, it may be desirable to randomly sample the data before providing such data to the contagion monitor 50 instead of attempting to analyze the raw data itself. Accordingly, in some cases, a sampler 70 may be provided between the contagion monitor 50 and the network 30. The sampler 70 may be configured to extract or filter a representative sample of the data for further analysis. In some cases, the sampler 70 may be reconfigurable to enable operators to select a desired sampling rate. However, in other cases, the sampler 70 may be configured for a fixed and predetermined sampling rate. For example, the sampler 70 may be configured to pass on every tenth content item within the data to reduce the data by a factor of ten. In some examples, such as when the social media 40 is associated with TWITTER®, a device or service providing access to real time historical social media data streams, e.g., a GNIP® Decahose stream may be employed as the sampler 70. The GNIP® Decahose may provide a 10% random sample of the real-time TWITTER® Firehose through a streaming connection. Thus, for example, the sampler 70 may act as a data spigot for determining either a fixed or varying amount of data that is passed along for further analysis.

As shown in FIG. 1, the contagion monitor 50 may include a number of components that are configured to perform individual tasks or functions of the contagion monitor 50. For example, the contagion monitor 50 may include a sliding window monitor 80. The sliding window monitor 80 may be configured to process the incoming data (e.g., messages and, in the case of TWITTER®, TWEETS®) to extract, track and nominate features of interest. For an example employing TWITTER®, the sliding window monitor 80 may be configured to act as an initial filter by being configured to extract hashtags, thereby again reducing the volume of data that is passed on for further analysis. As such, the contagion monitor 50 effectively performs a two-stage data filter before any substantive analysis is performed. The first filter stage (i.e., the sampler 70) is a non-discriminating or random filter, and the second filter stage (i.e., the sliding window monitor 80) is a discriminating filter that is configured specifically to filter feature data (i.e., features of interest) out of a content stream that includes both features and other content. As such, the discrimination of the second stage filter may be considered to filter based on form (i.e., content items that fit the proper form, such as hashtags).

In an example embodiment involving TWITTER®, the sliding window monitor 80 may be configured to receive the sampled TWITTER® feed and identify hashtags, "retweeted" hashtags, hashtag pairs, retweeted hashtag pairs, and token n-grams as features of interest (or just features). Hashtag pairs are sets of tags that appear together in the same TWEET®. Tracking pairs of hashtags may reveal situations where two hashtags begin to be associated with each other. The sliding window monitor 80 may be configured to track the frequency of each identified feature of interest over a predefined time interval (e.g., 10 minutes, 1 hour, four hours, etc.) and compare the number of occurrences of each identified feature of interest to a threshold. Each feature of interest that exceeds the threshold then becomes a candidate feature that is stored in data storage 82 and analyzed by the analytics engine 84 as described in greater detail below. The sliding window monitor 80 may also be configured to perform other types of processing before passing data along to subsequent stages in other example embodiments. For example, the sliding window monitor 80 may be configured to extract uniform resource locators (URLs), user mentions, words and phrases, or other items from TWEET® text or from other content when the social media 40 is not TWITTER®.

As can be appreciated from the descriptions above, an output of the sliding window monitor 80 may include features of interest that have exceeded a threshold number of occurrences within a given period of time. These features of interest may be considered to be popular features of interest for the given period of time due to their frequent usage within the given period of time. In some cases, the popular features of interest may be stored in the data storage 82 for further analysis by the analytics engine 84. However, in situations where it is important to respect or preserve the privacy of individuals associated with the clients 20 from which the features of interest were extracted, the data storage 82 may be configured to only store de-identified data. In this regard, any identifying information associated with the individuals associated with the clients 20 from which the features of interest were extracted may be removed prior to storing the popular features of interest in the data storage 82. In an example embodiment, de-identification may be accomplished by remapping identifying information to new identifiers via a random hash. In some cases, the data storage 82 may also be configured to automatically delete all raw data after a certain amount of time (e.g., 24 hours). Thus, the only data stored in the data storage 82 beyond 24 hours may be the records of user participation in hashtags and the user connections that form a relationship network (or friend graph) that is discussed in greater detail below. Moreover, in some cases, even the records of user participation and connections may be deleted after a longer period of time (e.g., 90 days).

The analytics engine 84 may be configured to select candidate features from among the popular features of interest. In this regard, for example, the analytics engine 84 may be configured to rank all popular features of interest in order of popularity (e.g., in order of the number of occurrences). The popularity ranking may then be used to select candidate features based on one of two criteria including 1) recency of achievement of a specified level of popularity (e.g., newness in a list of the most popular features), or 2) spread to other communities beyond a community of origin for features that are not recently popular.

In order to determine recency of achievement of the specified level of popularity, the specified level may be defined within the ranking of popular features. For example, the specified level of popularity could be a list of the most popular features (i.e., top 100, 300, 500, or some other useful level of popular features). A time window may be defined for evaluation of recency. The time window may be a multiple of the given time period. For example, if the given time period is 24 hours or one day, then the time window for evaluation of recency of achievement of the specified level of popularity may be 5 days. Thus, in an example embodiment, the analytics engine 84 may evaluate the list of the most popular features to identify any features that have not been in the list of the most popular features during the time window. Such features may be considered to meet the criteria for recency and may be selected as candidate features. For example, if the list of the most popular features is a top 300 list, and the time window is 5 days, then any feature that has not been in the top 300 list over the last 5 days will be selected as a candidate feature for further processing.

In order to determine spread to other communities beyond the community of origin, the analytics engine 84 may be configured to build a relationship network based on the data stored in the data storage 82. In some cases, the relationship network may be built and maintained based on the data stored in the data storage 82 during the time window (or some other defined period of time). Thus, for example, the analytics engine 84 may analyze the users (e.g., clients 20) who have used the popular features in the last 5 days and determine which users have been mentioned or retweeted by (or have mentioned or retweeted) the users. This effectively creates a retweet/mention network of adopters, which forms the relationship network. The relationship network may include information indicative of individual local networks, and may be updated or regenerated each month, or at some other desired interval. The spread of popular features between these individual local networks is what is used by the analytics engine 84 to determine candidate features. In this regard, the analytics engine 84 may be configured to determine popular features that have spread to other individual local networks. In particular, for example, the analytics engine 84 may be configured to determine which popular features have spread to a number of individual local networks that has increased by at least a given percentage (e.g., 20%) since the last time the feature was popular. Of note, this method of determining candidacy does not require newness to the list of the most popular features. Thus, for example, the analytics engine 84 may be configured to determine whether a feature has been in the top 300 list at any time during the last 5 days (i.e., the time window), but further determine that the number of communities that the feature is relevant for has increased by at least 20% since the last time the feature was selected for evaluation as a candidate feature. This determination effectively indicates whether the corresponding feature is breaking out of its local networks to begin to rapidly spread to other networks.

In some cases, the analytics engine 84 may be configured to include a blacklist of hashtags that contain spam or TWITTER® "memes" that are obviously not related to social movements. Features that are on the blacklist may be omitted from the analysis described above. Thus, to reduce computational loading, the blacklist may act as a third filter stage. As noted above, the first filter stage may be completely random, the second filter stage may filter based on form to identify content items that qualify as features of interest, and the third filter stage may filter based on a priori knowledge of specific features that do not substantively qualify (or should not qualify) as candidate features. Accordingly, the three stages of filtration may include a random data reduction stage, a form-based data reduction stage and a substance-based data reduction stage, where the substance-based data reduction stage uses a priori knowledge about specific content items that are not of the desired type from a substantive perspective. This three-stage filtration may, in some cases, be accomplished such that the stages of filtration are performed on all data in sequence (i.e., first a random data reduction, and then a form-based reduction of the set of data that had already been reduced randomly, and then a substance (or type) based reduction on the set of data that has been reduced based on form and randomly).

In an example embodiment, the analytics engine 84 may further be configured to calculate various metrics associated with candidate features. For example, some of the metrics may include a calculation of a cumulative distribution, over k, of the percent of users who started tweeting about the feature after k or more neighbors had done so. This metric may be referred to as CDF_k. The value of k may be set to two or three to ensure that the result indicates that social pressure of multiple neighbor adopters has been present before a particular user adopted a hashtag (i.e., a feature of interest). Another metric that may be calculated includes the calculation of the percent of all users who started tweeting about the feature before any of their network neighbors had done so, over time. Another metric, which may be referred to as a mean tie ratio (MTR), may include an average density of connections among the first n adopters of the feature, n=1 to 100. Other metrics that may be calculated may include a number of adopters of the feature over time, and an average fraction of connections between adopting neighbors over time. These metrics may be useful for further analysis performed by the analytics engine 84.

Upon selection of the candidate features based on the criteria for recency of popularity or expansion to other networks, the candidate features are evaluated by the analytics engine 84 for specific criteria that will determine whether or not the candidate features will be the subject of one of the alerts 60. In this regard, the contagion monitor 50 may be configured to generate a complex contagion score and a critical mass score for each candidate feature. The complex contagion score represents how likely the corresponding candidate feature is to be a complex contagion (i.e., a risky or socially costly behavior that is likely to have a high threshold of adoption). The critical mass score represents, for complex contagions, how likely the feature is to have reached critical mass, after which the complex contagion begins to rapidly spread. After each of these scores has been calculated, the scores can be reported for each respective candidate feature. However, in some cases, the analytics engine 84 may issue alerts 60 for specific ones of the candidate features based on their scores (e.g., comparing their scores to a threshold, and issuing an alert to scores exceeding the threshold).

In an example embodiment, the analytics engine 84 may be configured to calculate a complex contagion score that is a reflection of the need for social reinforcement for ideas that are political and/or controversial to spread, whereas ideas that require less social reinforcement to induce spreading are more likely to be news or sports related events. In this regard, the complex contagion score may be defined as:

$$\text{Complex Contagion Score} = 0 + 1 \times (\log_{10}(\text{average\_density\_of\_connections for first 100 adopters}) > -3) + 1 \times (\text{CDF\_}k(2) < 0.7) \qquad (1),$$

where CDF_k is the above-mentioned metric of cumulative distribution, over k, of the percent of users who started tweeting about the feature after k or more neighbors had done so, where an effort is made to determine where an adopter of the candidate feature did so only after at least 3 friends had also adopted the candidate feature. The fact that numerous friends needed to adopt the candidate feature before the adopter is a powerful suggestion of social reinforcement, and therefore complex contagion.

As can be appreciated from equation (1), the complex contagion score may be 0, 1, or 2. A score of 0 indicates that the corresponding candidate feature is unlikely to be a complex contagion, and a score of 2 indicates that the candidate feature is very likely to be a complex contagion.

In an example embodiment, the analytics engine 84 may be configured to determine the criticality score to detect when a trend or idea associated with a particular candidate feature is about to "break out". This means that the candidate feature is achieving enough popularity in a local group to enable the candidate feature to travel widely, in a time window, for example, outside of that initial group of adopters. The contagion monitor 50 is configured to utilize the criticality score in combination with various complexity factors to gain insights into the trending topics. In this regard, for example, based on statistics regarding how the topic is spreading, it may be possible to predict that the candidate feature is related to a topic that people find controversial and that is about to spread similarly to a social movement.

The critical mass score of an example embodiment may be determined to be either a 0, 1, or 2. The critical mass score may be calculated by the analytics engine 84 as follows:

critical_mass_score=0 if min(mean_overlap_per_integtime2)*1.5<maxoverlap: critical_mass_score+=1 if cummulativeadoptions[0]*3<cummulativeadoptions[-1]: critical_mass_score+=1

In the context of the calculation outlined above, "min (mean_overlapper_integtime2)" defines an array that is the average of the number of ties between adopter neighbors divided by the total number of ties between adopter neighbors, calculated for all adopters. Meanwhile, "maxoverlap" is the maximum of that array. Accordingly, "min (mean_overlap_per_integtime2)*1.5<maxoverlap," tests to determine if there has been a sudden drop in overlap. The sudden drop in overlap is a signature that may predict a topic has just broken out of the community of initial adopters. The value of "cumulativeadoptions" is an array tracking the number of adopters over time.

An example embodiment of the invention will now be described with reference to FIG. 2. FIG. 2 shows certain elements of an apparatus for provision of the contagion monitoring capabilities described herein according to an example embodiment. The apparatus of FIG. 2 may be employed, for example, on a device such as, for example, a network device, server, proxy, or the like at which the contagion monitor 50 may be instantiated. It should be noted that the devices or elements described below may not be mandatory and thus some may be omitted in certain embodiments.

Referring now to FIG. 2, an apparatus for provision contagion monitoring in accordance with an example embodiment is provided. The apparatus may provide many exemplary embodiments of the contagion monitor 50. As such, configurations of the apparatus as described herein may transform the apparatus into the contagion monitor 50. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device 104 (which may be embodied as, be a portion of, or be separate from the data storage 82) and a processor 102 that may be in communication with or otherwise control a user interface 108 (which may be optional) and a device interface 106. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation, or even one of various mobile computing devices. In situations where the processing circuitry 100 is embodied as a server or at a remotely located computing device, the user interface 108 (if employed at all) may be disposed at another device that may be in communication with the processing circuitry 100 via the device interface 106 and/or a network (e.g., network 30).

The user interface 108 (if employed) may be in communication with the processing circuitry 100 to receive an indication of a user input at the user interface 108 and/or to provide an audible, visual, mechanical or other output to the user (e.g., alerts 60). As such, the user interface 108 may include, for example, a keyboard, a mouse, a joystick, a display, a touch screen, a microphone, a speaker, a cell phone, or other input/output mechanisms. In embodiments where the apparatus is embodied at a server or other network entity, the user interface 108 may be limited or even eliminated in some cases. Alternatively, as indicated above, the user interface 108 may be remotely located. In some cases, the user interface 108 may also include a series of web pages or interface consoles generated to guide the user through various options, commands, flow paths, and/or the like for control of or interaction with the contagion monitor 50. The user interface 108 may also include interface consoles or message generation capabilities to send instructions, warnings, alarms (e.g., alerts 60), etc., and/or to provide an output that clearly indicates a complex contagion score and a critical mass score in association with a candidate feature.

The device interface 106 may include one or more interface mechanisms for enabling communication with other devices and/or networks. In some cases, the device interface 106 may be any means such as a device or circuitry embodied in either hardware, software, or a combination of hardware and software that is configured to receive and/or transmit data from/to a network and/or any other device or module in communication with the processing circuitry 100. In this regard, the device interface 106 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet, or other methods. In situations where the device interface 106 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 104 may include one or more non-transitory storage or memory devices such as, for example, volatile and/or non-volatile memory that may be either fixed or removable. The storage device 104 may be configured to store information, data, applications, instructions, or the like for enabling the apparatus to carry out various functions in accordance with example embodiments of the present invention. For example, the storage device 104 could be configured to buffer input data for processing by the processor 102. Additionally or alternatively, the storage device 104 could be configured to store instructions for execution by the processor 102. As yet another alternative, the storage device 104 may include one of a plurality of databases (e.g., data storage 82) that may store a variety of files, contents, or data sets such as the relationship network. Among the contents of the storage device 104, applications may be stored for execution by the processor 102 in order to carry out the functionality associated with each respective application.

The processor 102 may be embodied in a number of different ways. For example, the processor 102 may be embodied as various processing means or mechanisms such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the storage device 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an application-specific integrated circuit (ASIC) or field-programmable gate array (FPGA), or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the contagion monitor 50, which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the contagion monitor 50 (or components thereof, such as the sliding window monitor 80 and/or the analytics engine 84) as described herein.

The contagion monitor 50 may be configured to receive sampled data and apply the sliding window monitor 80 to further filter the data to identify features of interest. The features of interest, along with information useful in determining the relationship network, may then be stored (e.g., in the data storage 82). The analytics engine 84 may determine the relationship network and various metrics including at least the CDF_k and the MTR, as described above. In some cases, the CDF_k may effectively define an observed adoption threshold. Thereafter, the complex contagion score and critical mass score may each be determined as discussed above, and any applicable alerts 60 or messages may be generated. In an example embodiment, the contagion monitor 50 may be configured to manage a process flow illustrated in the block diagram of FIG. 3. However, it should be appreciated that the operations may, in some cases, be conducted in parallel with each other, or in different orderings. Thus, FIG. 3 is merely one non-limiting example.

Referring now to FIG. 3, the contagion monitor 50 may be configured to receive sampled data at operation 200. The sampled data may be received from the sampler 70 of FIG. 1, and may be the result of a first stage of filtering for the reduction of data that will ultimately be analyzed and processed. At operation 210, the sliding window monitor 80 may be applied to extract features of interest (e.g., hashtags). In some cases, data may be de-identified and stored at operation 220. At operation 230, a blacklist (or feature of interest type filter) may be applied in order to remove features of interest (or hashtags) that are clearly of a type that is not complex contagion (e.g., sports related hashtags). A relationship network may be determined or constructed at operation 240. At operation 250, a determination of recency of popularity and breakout regarding the features of interest over time may be conducted in order to identify candidate features (i.e., those that have recently become popular, or seem to be breaking out of their local networks even if they are not newly popular). Various metrics discussed above may be calculated (e.g., CDF_k, MTR, etc.) on only those candidate features at operation 260 so that complex contagion scores and critical mass scores can be conducted also only on the candidate features. At operation 280, the contagion monitor 50 generates alerts or otherwise produces the results of the complex contagion and critical mass scoring so that public policy makers can evaluate current trends and potential social movements.

From a technical perspective, the contagion monitor 50 described above may be used to support some or all of the operations described above. As such, the platform described in FIGS. 1-2 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry, and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means, methods, and/or mechanisms for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means, methods, and/or mechanisms for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include method for determining social contagion while monitoring social media may be executable via operation of configured processing circuitry. The method may include receiving data indicative of social media activity of a plurality of users at operation 300, selecting features of interest from the data at operation 310, building a relationship network indicative of connections between the users and local networks to which various ones of the users belong at operation 320, analyzing the features of interest to determine candidate features for classification as social contagion at operation 330, determining a complex social contagion score for the candidate features at operation 340, and providing an indication regarding the classification as social contagion based on the complex social contagion score at operation 350.

In some embodiments, the features or operations described above may be augmented or modified, or additional features or operations may be added. These augmentations, modifications, and additions may be optional and may be provided in any combination. Thus, although some example modifications, augmentations, and additions are listed below, it should be appreciated that any of the modifications, augmentations, and additions could be implemented individually or in combination with one or more, or even all of the other modifications, augmentations, and additions that are listed. As such, for example, the method may further include determining a critical mass score for the candidate features in a time window. In such an example, providing the indication regarding the classification as social contagion may be further performed based on the critical mass score. In an example embodiment, the critical mass score may represent a likelihood that the candidate feature has reached critical mass. The complex contagion score may represent a likelihood that the candidate feature is a complex contagion. In an example embodiment, the candidate feature may be an expression of a trend or idea that has been adopted by a user responsive to an apparent social pressure from a local network of the user. The complex contagion score may be indicative of a requirement for social pressure from at least two neighbors of the user from within the local network of the user to trigger adoption. In some cases, the method may further include comprising applying a multi-stage filter to the received data to reduce processing load associated with analyzing the features of interest. In this regard, for example, applying the multi-stage filter may include applying a first stage filter to randomly sample the received data, and applying a second stage filter to define a format for the features of interest. In an example embodiment, applying the multi-stage filter may further include applying a third stage filter to filter features of interest by type criteria to identify the candidate features. In some cases, analyzing the features of interest may include determining candidate features based on recency of achievement of a specified level of popularity of the feature of interest, or spread of the feature of interest to other networks beyond a local network of the user (whether or not the feature of interest has achieved the specified level of popularity recently). In an example embodiment, the features of interest are TWITTER® hashtags, and the candidate features are hashtags that have entered the top 300 most popular hashtags within a time window (e.g., 5 days), or hashtags that appear to have broken out of the local network of the user.

In an example embodiment, an apparatus for performing the method of FIG. 4 above may comprise a processor (e.g., the processor 102) or processing circuitry configured to perform some or each of the operations (300 through 350) described above. The processor may, for example, be configured to perform the operations (300 through 350) by performing hardware implemented logical functions, executing stored instructions, or executing algorithms for performing each of the operations. In some embodiments, the processor or processing circuitry may be further configured for the additional operations or optional modifications to operations 300 to 350 that are discussed above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits, and/or solutions described herein should not be thought of as being critical, required, or essential to all embodiments or to that which is claimed herein. Although specific terms are employed herein, they are used in a generic and descriptive sense only and not for purposes of limitation.

What is claimed is:

1. A contagion monitoring apparatus comprising:
a device interface configured to connect the contagion monitoring apparatus to a communications network to access a data stream for a social networking service;
processing circuitry operably coupled to the device interface; and
a memory storing instructions that, when executed by the processing circuitry, cause the processing circuitry to:
autonomously monitor the data stream of the social networking service;
receive data indicative of social media activity of a plurality of users on the social networking service via the data stream, the date comprising features of interest;
build, and regenerate at an interval, a relationship network, based on the data, that defines a plurality of local networks of users of the social networking service, each local network being a collection of users of the social media networking service linked via mentions and repostings of social media content;
determine popular features of interest from the features of interest, the popular features of interest being features of interest that occur within a popular feature time period more than a popular feature threshold number of times;
determine which of the popular features of interest are candidate features for classification as a social contagion by determining which of the popular features of interest satisfies either a recency of popularity criterion or a spreading criterion;
determine a complex social contagion score for the candidate features; and provide an indication regarding the classification as a social contagion based on the complex social contagion score;

wherein the instructions, when executed by the processing circuitry, further cause the processing circuitry to determine which of the popular features of interest satisfies the recency of popularity criterion by:
generating a ranking list of the popular features of interest, the ranking list consisting of the popular features of interest that have occurred within the data more than a recency threshold number of times over a recency time window, the recency time window being a sliding window that is longer than the popular feature time period, the recency threshold number of times being different from the popular feature threshold number of times, and the popular features of interest that have occurred within the data more than the recency threshold number of times over the recency time window being a proper subset of the popular features of interest; and
determining which of the popular features of interest do not appear in the ranking list due to a recency of occurrence of the popular features of interest;

wherein the instructions, when executed by the processing circuitry, further cause the processing circuitry to determine which of the popular features of interest satisfies the spreading criterion by determining, for each of the popular features of interest, whether the respective popular feature of interest has spread from an initial local network to more than a threshold percentage of other local networks of the relationship network since a previous analysis of the respective popular feature of interest for classification as a social contagion.

2. The apparatus of claim 1, wherein the instructions, when executed by the processing circuitry, further cause the processing circuitry to:
determine a critical mass score for the candidate features;
provide the indication regarding the classification as a social contagion based on the critical mass score; and
output a warning of an occurrence of a social contagion based on the critical mass score.

3. The apparatus of claim 2, wherein the critical mass score represents a likelihood that a candidate feature of the candidate features has reached critical mass.

4. The apparatus of claim 1, wherein the complex social contagion score represents a likelihood that a given candidate feature of the candidate features is a complex contagion.

5. The apparatus of claim 4, wherein the given candidate feature is an expression of a trend or idea that has been adopted by a particular user of the plurality of users responsive to apparent social pressure from a given local network to which the particular user belongs, the given local network to which the particular user belongs being one of the plurality of local networks of the relationship network, and
wherein the complex social contagion score is indicative of a requirement for social pressure from at least two neighbors of the particular user from within the given local network of the particular user to trigger adoption.

6. The apparatus of claim 4, wherein the given candidate feature is an expression of a trend or idea in the recency time window that has been adopted by a particular user of the plurality of users responsive to apparent social pressure from a given local network to which the particular user belongs, the given local network to which the particular user belongs being one of the plurality of local networks of the relationship network, and wherein the complex social contagion score is indicative of a requirement for social pressure from at least two neighbors of the particular user from within the given local network of the particular user to trigger adoption.

7. The apparatus of claim 1, further comprising a multi-stage filter configured to filter the received data to reduce processing load associated with analyzing the features of interest.

8. The apparatus of claim 7, wherein the multi-stage filter comprises a sampler configured to randomly sample the received data, and a sliding window monitor configured to define a format for the features of interest.

9. The apparatus of claim 8, wherein the multi-stage filter further comprises a third stage filter to filter the features of interest by type criteria.

10. A method executable via operation of configured processing circuitry, the method comprising:
autonomously monitoring, via a device interface operably coupled to the processing circuitry, a data stream of a social networking service via a connection to a communications network to access the data stream of the social networking service;
receiving data indicative of social media activity of a plurality of users on the social networking service via the data stream, the data comprising features of interest;
building, and regenerating at an interval, a relationship network, based on the data, that defines a plurality of local networks of users of the social networking service, each local network being a collection of users of the social media networking service linked via mentions and repostings of social media content;
determining popular features of interest from the features of interest, the popular features of interest being features of interest that occur within a popular feature time period more than a popular feature threshold number of times;
determining which of the popular features of interest are candidate features for classification as a social contagion by determining which of the popular features of interest satisfies either a recency of popularity criterion or a spreading criterion,
determining a complex social contagion score for the candidate features; and
providing an indication regarding the classification as a social contagion based on the complex social contagion score;
wherein determining which of the popular features of interest satisfies the recency of popularity criterion comprises:
generating a ranking list of the popular features of interest, the ranking list consisting of the popular features of interest that have occurred within the data more than a recency threshold number of times over a recency time window, the recency time window being a sliding window that is longer than the popular feature time period, the recency threshold number of times being different from the popular feature threshold number of times, and the popular features of interest that have occurred within the data more than the recency threshold number of times over the recency time window being a proper subset of the popular features of interest; and
determining which of the popular features of interest do not appear in the ranking list due to a recency of occurrence of the popular features of interest;
wherein determining which of the popular features of interest satisfies the spreading criterion comprises determining, for each of the popular features of interest, whether the respective popular feature of interest has spread from an initial local network to more than a threshold percentage of other local networks of the relationship network since a previous analysis of the respective popular feature of interest for classification as a social contagion.

11. The method of claim 10, further comprising determining a critical mass score for the candidate features,
wherein the providing the indication regarding the classification as a social contagion is further performed based on the critical mass score; and
wherein the method further comprises outputting a warning of an occurrence of a social contagion based on the critical mass score.

12. The method of claim 11, wherein the critical mass score represents a likelihood that a candidate feature of the candidate features has reached critical mass.

13. The method of claim 10, wherein the complex social contagion score represents a likelihood that a given candidate feature of the candidate features is a complex contagion.

14. The method of claim 13, wherein the given candidate feature is an expression of a trend or idea that has been adopted by a particular user of the plurality of users responsive to apparent social pressure from a given local network to which the particular user belongs, the given local network to which the particular user belongs being one of the plurality of local networks of the relationship network, and wherein the complex social contagion score is indicative of a requirement for social pressure from at least two neighbors of the particular user from within the given local network of the particular user to trigger adoption.

15. The method of claim 10, further comprising applying a multi-stage filter to the received data to reduce processing load associated with analyzing the features of interest.

16. The method of claim 15, wherein the applying the multi-stage filter comprises applying a first stage filter to randomly sample the received data, and applying a second stage filter to define a format for the features of interest.

17. The method of claim 16, wherein applying the multi-stage filter further comprises applying a third stage filter to filter the features of interest by type criteria.

18. The method of claim 10 wherein the complex social contagion score for a given candidate feature of the candidate features is determined based on a cumulative distribution, over k, of a percent of neighbors within a given local network that mention or repost the given candidate feature after k or more neighbors of the given local network have mentioned or reposted the given candidate feature, where k is 2 or 3.

19. The method of claim 10 wherein the data used for building and regenerating the relationship network is de-identified to remove individual-identifying information by remapping individual-identifying information to new identifiers via a random hash.

* * * * *